US007360919B2

(12) United States Patent
Chan

(10) Patent No.: US 7,360,919 B2
(45) Date of Patent: Apr. 22, 2008

(54) PORTABLE LIGHTING DEVICE

(75) Inventor: Louie Siu Heng Chan, Kwai Chung (HK)

(73) Assignee: Germain Electronic Limited, New Territories, Hong Kong SAR (HK)

( * ) Notice: Subject to any disclaimer, the term of this patent is extended or adjusted under 35 U.S.C. 154(b) by 75 days.

(21) Appl. No.: 11/339,615

(22) Filed: Jan. 26, 2006

(65) Prior Publication Data

US 2007/0171633 A1 Jul. 26, 2007

(51) Int. Cl.
*F21L 13/00* (2006.01)
*F21L 4/00* (2006.01)
*B60Q 1/00* (2006.01)
*F21V 23/04* (2006.01)

(52) U.S. Cl. ...................... 362/183; 362/192; 362/802; 362/812; 362/276

(58) Field of Classification Search ................ 362/183, 362/192
See application file for complete search history.

(56) References Cited

U.S. PATENT DOCUMENTS

| | | | | |
|---|---|---|---|---|
| 4,835,664 | A * | 5/1989 | Wen | 362/183 |
| 4,974,129 | A * | 11/1990 | Grieb et al. | 362/494 |
| 5,055,984 | A * | 10/1991 | Hung et al. | 362/183 |
| 6,784,357 | B1 * | 8/2004 | Wang | 136/244 |
| 2005/0092356 | A1 * | 5/2005 | Sakai | 136/251 |
| 2005/0152135 | A1 * | 7/2005 | Cai | 362/167 |
| 2006/0012978 | A1 * | 1/2006 | Allsop et al. | 362/183 |
| 2006/0028846 | A1 * | 2/2006 | Yang | 362/640 |
| 2006/0039135 | A1 * | 2/2006 | Jones et al. | 362/145 |

* cited by examiner

*Primary Examiner*—Jong-Suk (James) Lee
*Assistant Examiner*—David J Makiya
(74) *Attorney, Agent, or Firm*—Leydig, Voit & Mayer, Ltd.

(57) ABSTRACT

A portable lighting device includes a main unit, rechargeable battery cells housed in the main unit, and a lighting unit including a light source and a solar panel. The lighting unit is attached to the main unit and is supported by the main unit for movement between a first position situated close to the main unit and exposing the light source for illumination and a second position extending from the main unit and exposing the solar panel for recharging the battery cells.

8 Claims, 8 Drawing Sheets

PORTABLE LIGHTING DEVICE

The present invention relates to a portable lighting device that incorporates a solar panel.

BACKGROUND OF THE INVENTION

Electrical/electronic appliance and devices can be powered by solar panels (solar cells), in which case rechargeable battery cells are usually incorporated for storing the electrical power generated by the solar panels. The solar panels used in these products, such as garden lamps and calculators, are mounted on the casings.

The invention seeks to provide a portable lighting device which incorporates a solar panel that is arranged in a novel way.

SUMMARY OF THE INVENTION

According to the invention, there is provided a portable lighting device comprising a main unit, a rechargeable power storage device housed in the main unit, and a lighting unit including a light source and a solar panel. The lighting unit is attached to the main unit and supported thereby for movement between a first position situated close to the main unit and exposing the light source for illumination and a second position extending from the main unit and exposing the solar panel for recharging the power storage device.

Preferably, the lighting unit has two opposite sides facing in opposite directions, and the light source and the solar panel are provided at the opposite sides of the lighting unit respectively.

In a preferred embodiment, the lighting unit and the main unit have respective sides lying in close proximity upon each other when the lighting unit is in the first position, and the solar panel is provided at that side of the lighting unit such that it is concealed from sight in the first position of the lighting unit.

More preferably, the two sides of the lighting unit and the main unit have matching shape and size.

Further more preferably, the lighting unit and the main unit have respective surfaces which surround their said sides and lie substantially flush with each other in the first position of the lighting unit.

It is preferred that the said side of the lighting unit faces upwardly in the second position of the lighting unit.

It is further preferred that the said side of the lighting unit extends substantially horizontally in the second position of the lighting unit.

It is preferred that the said sides of the lighting unit and the main unit extend substantially vertically in the first position of the lighting unit.

Preferably, the lighting unit is connected to the main unit by means of a hinge assembly which enables said movement of the lighting unit pivotally relative to the main unit.

In a preferred embodiment, the lighting unit is connected to the main unit by means of a hinge assembly which enables said movement of the lighting unit pivotally relative to the main unit.

More preferably, the hinge assembly comprises a first hinge about which the lighting unit is pivotable upwardly from the main unit and a second hinge about which the lighting unit is pivotable to have its said side facing upwardly.

Further more preferably, the hinge assembly includes a connecting member which is connected by the first hinge to the main unit and by the second hinge to the lighting unit.

More preferably, the hinge assembly comprises two hinges whose hinge axes extend at substantially right angles with each other.

It is preferred that the light source comprises a florescent tube.

It is preferred that the solar panel comprises two panels which are pivotable to lie close to each other in the first position of the lighting unit and are pivotable open in the second position of the lighting unit.

BRIEF DESCRIPTION OF DRAWINGS

The invention will now be more particularly described, by way of example only, with reference to the accompanying drawings, in which.

DETAILED DESCRIPTION OF PREFERRED EMBODIMENT

Figure 1:
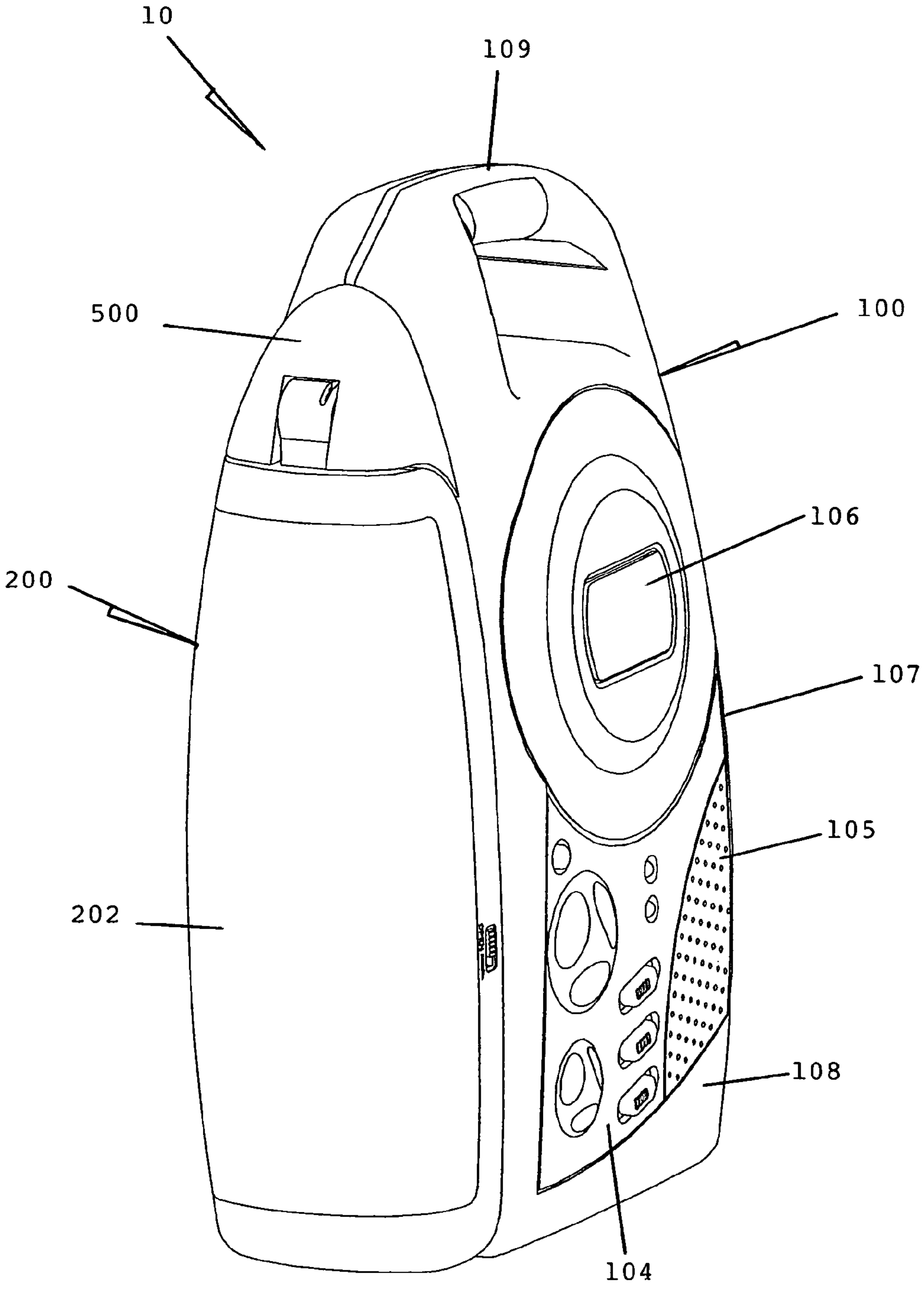
FIG. 1 is a perspective view of an embodiment of a portable lighting device in accordance with the invention, with a lighting unit lying close to a main unit thereof.

Referring to the drawings, there is shown a portable lighting device in the form of a lantern 10 embodying the invention, which comprises an upright main unit 100, a series of rechargeable battery cells 101 housed in the main unit 100, and an oblong lighting unit 200 including two florescent light tubes 300 and a solar panel 400 formed by an array of photovoltaic cells. The light tubes 300 are wired to and powered by the rechargeable battery cells 101, which is in turn wired to and recharged by the solar panel 400 or alternatively recharged by an external charger connected by a cable with a plug into a DC jack of the main unit 100. These form part of an operating circuit that controls various functions of the lantern 10.

Figure 4:
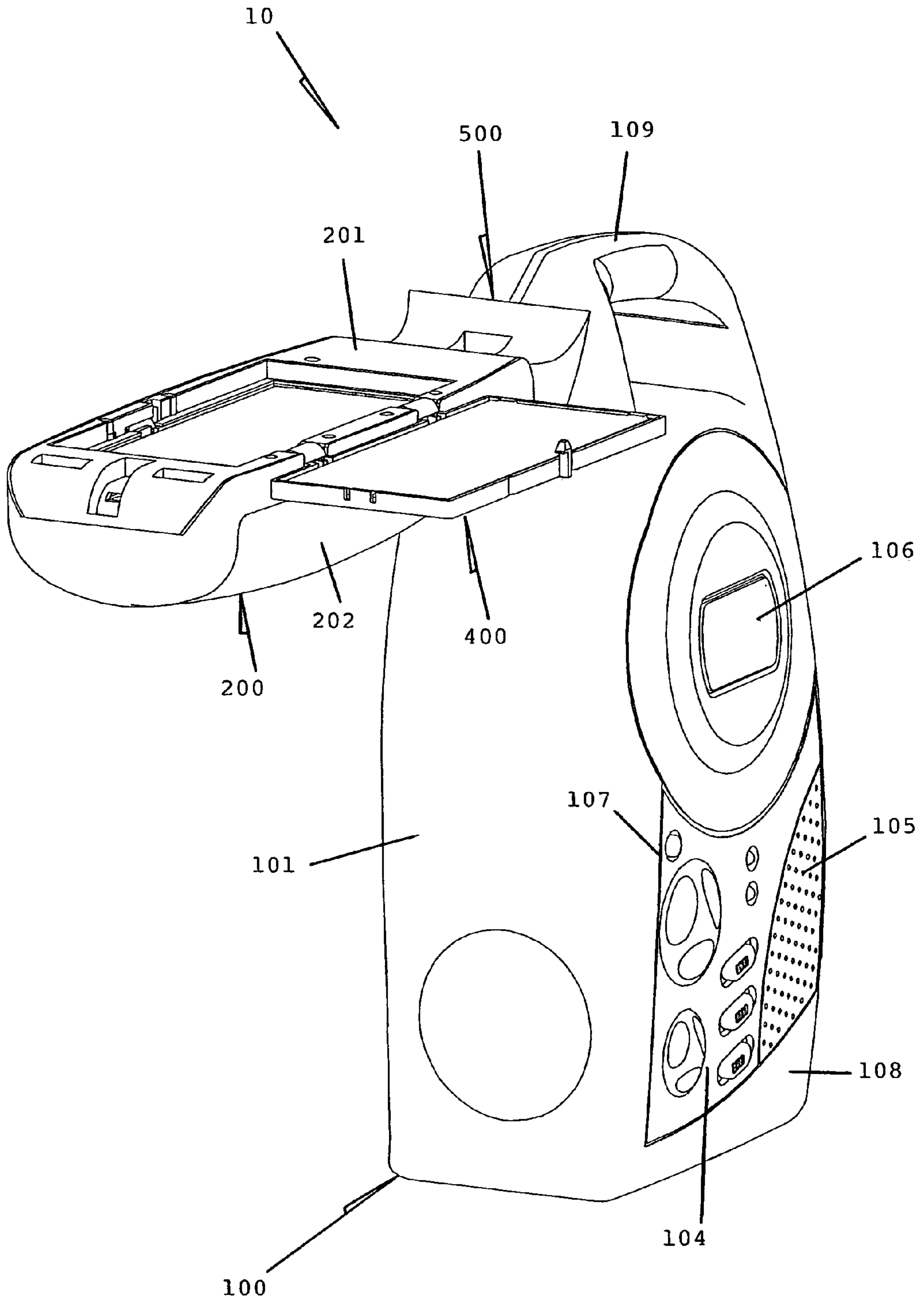
FIG. 4 is a perspective view similar to FIG. 3, showing a solar panel opened flat.
Figure 5A:
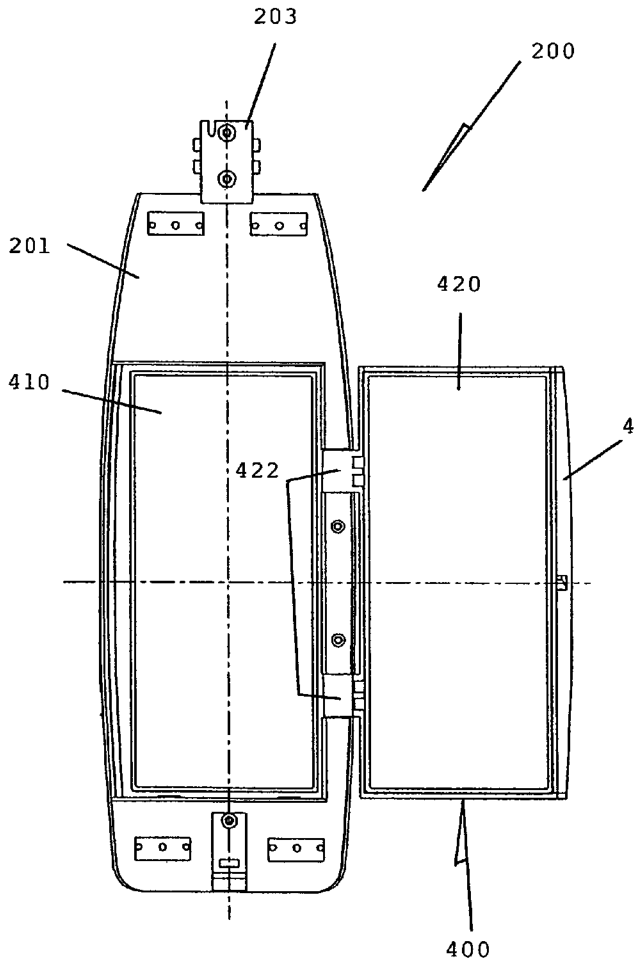
FIGS. 5A and 5B are plan and side views of the lighting unit of FIG. 4.
Figure 5B:
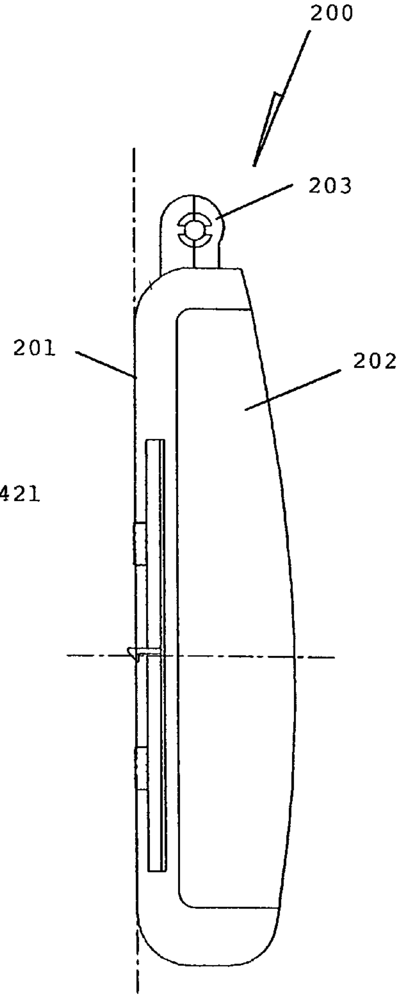
Figure 6:
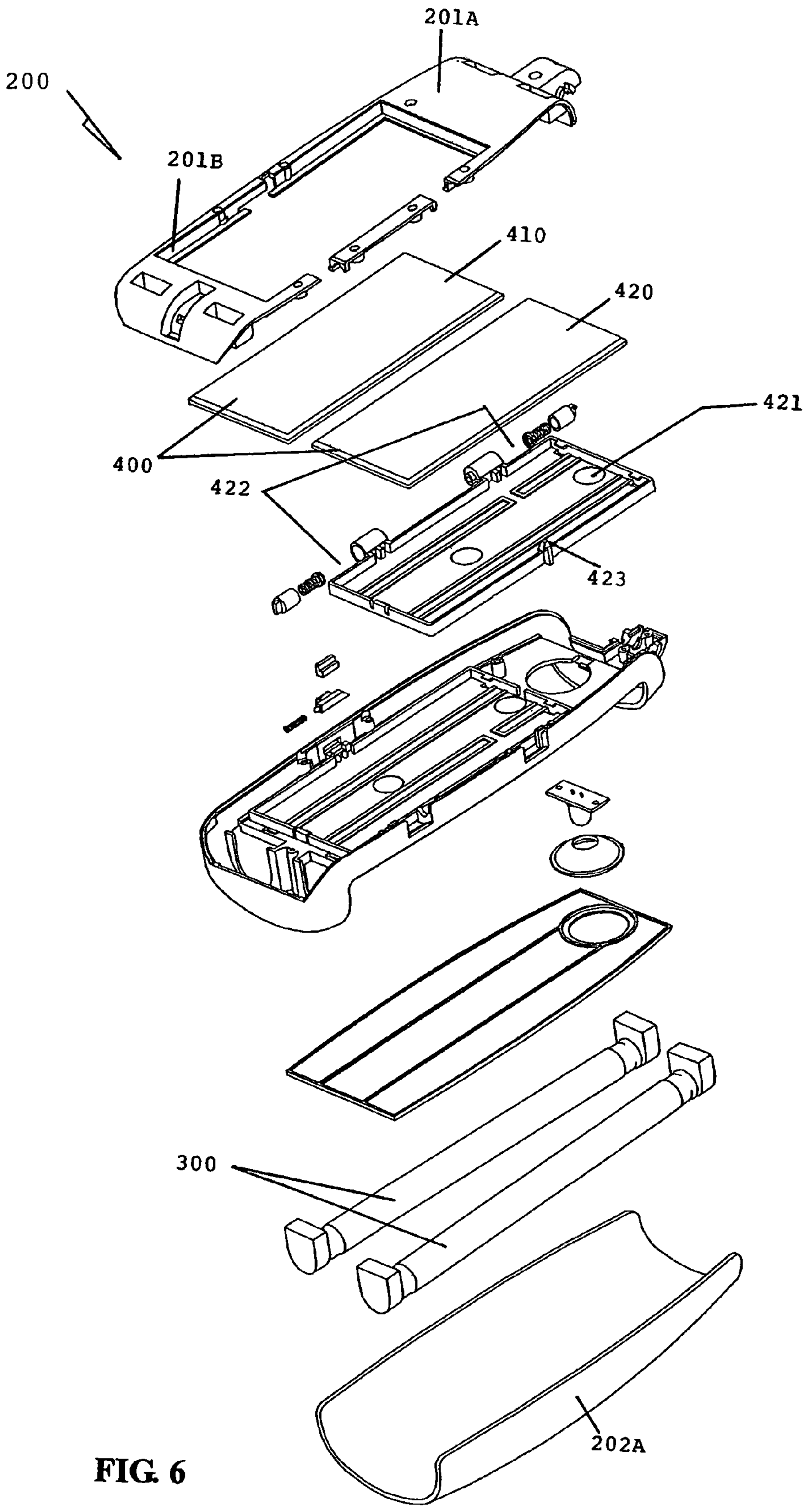
FIG. 6 is an exploded perspective view of the lighting unit of FIG. 4.
Figure 7:
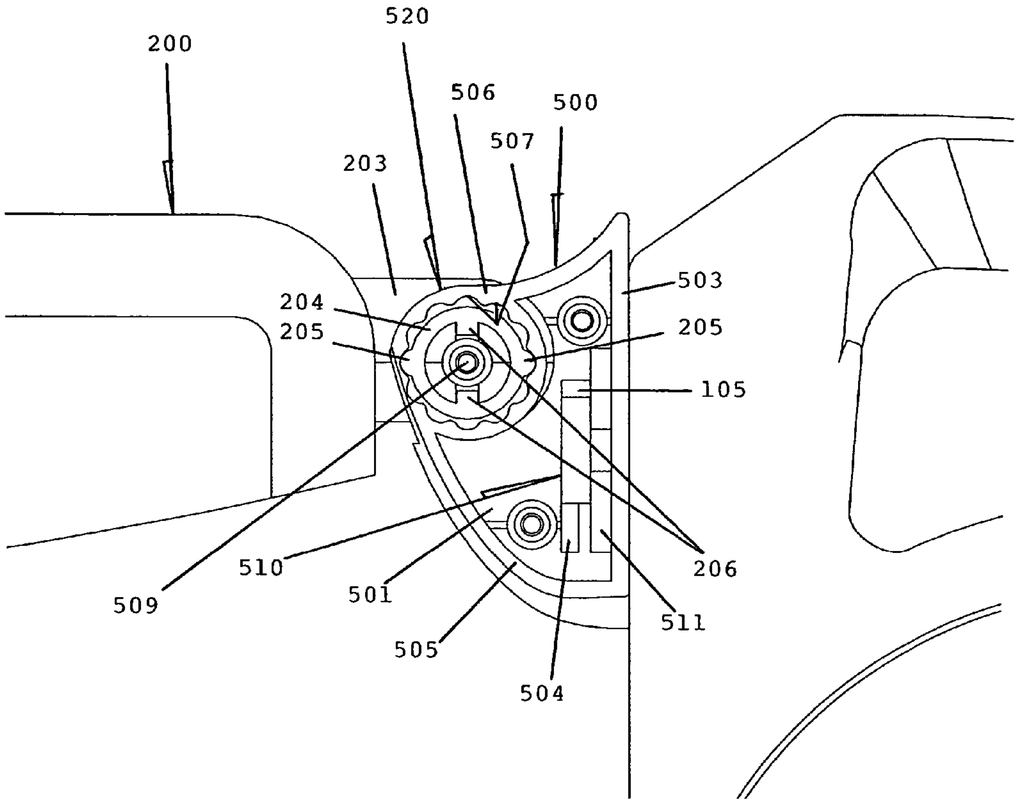
FIG. 7 is a fragmentary view showing the internal construction of a hinge assembly connecting the lighting unit to the main unit of FIG. 1.
Figure 8:
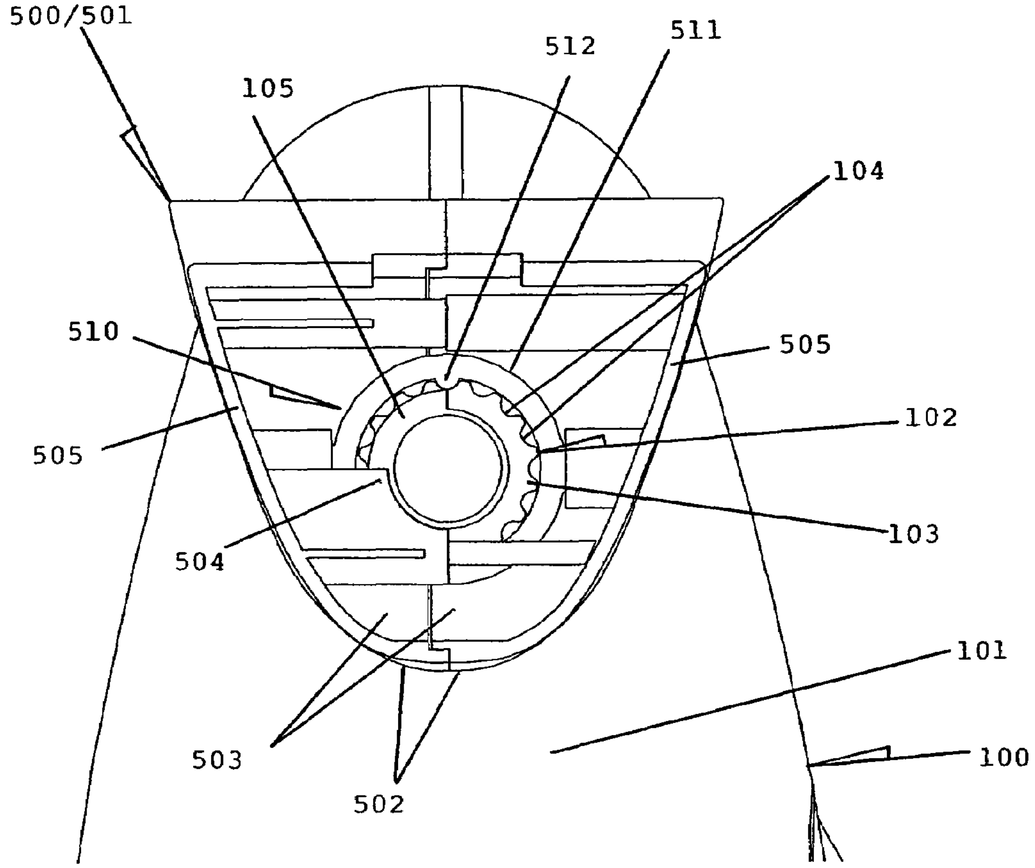
FIG. 8 is another fragmentary view showing the internal construction of the hinge assembly of FIG. 7.
Figure 9:
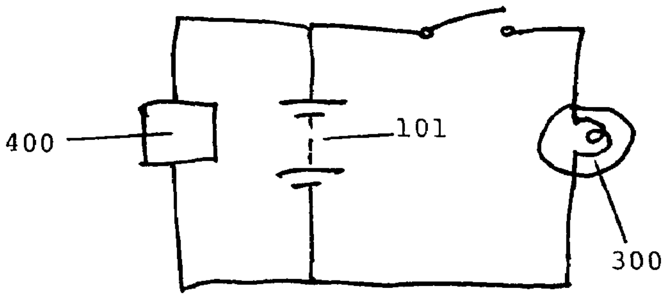
FIG. 9 is a schematic simplified operating circuit diagram of the portable lighting device of FIG. 1.

The main unit 100 has an integral top handle 109 and a front surface 108 which presents a control panel 107 including an LCD display 106 with a speaker grille 105 and relevant control keys 104 for an additional radio function of the lantern 10 (see FIG. 4).

The lighting unit 200 is attached to the left side of the main unit 100 adjacent the top handle 109. It is supported by the main unit 100 for pivotal movement between a first, retracted position (FIG. 1) situated close to the main unit 100 and exposing the light tubes 300 for lighting and a second, extended position (FIG. 3 or 4) extending from the main unit 100 and exposing the solar panel 400 for recharging the battery cells 101.

The lighting unit 200 has a generally flat inner side 201 and a generally convex outer side 202 which are opposite each other and face in opposite directions. The light tubes 300 and the solar panel 400 are provided at, and more specifically within, the opposite outer and inner sides 202 and 201 respectively. The light tubes 300 are protected by a convex transparent cover 202A that defines the outer side 202.

The solar panel 400 is formed by a pair of rectangular panel parts or narrower panels 410 and 420. The first panel 410 is fixed and extends across a matching aperture 201B through a casing part 201A of the lighting unit 200 on its inner side 201. The second panel 420 is mounted on a lid 421 which is in turn connected to one longer side of the casing part 201A by a pair of hinges 422 for closing the aperture 201B. The hinges 422 are spring-loaded to bias the lid 421 and hence the second panel 420 open flat from the first panel 410.

The two solar panels 410 and 420 are wired together for recharging the battery cells 101 when they are opened flat (FIG. 4). Upon pivoting the second panel 420 to lie upon or close to the first panel 410, the lid 421 is held closed by a latch hook 423 to shut the aperture 201B and hence protect both panels 410 and 420. The use of two solar panels 410 and 420 doubles the power, which can be folded together for physical protection when they are not in use and for size reduction to fit within the lighting unit 200.

The main unit 100 has a generally flat vertical surface 101 on its left side, in close proximity upon which the inner side 201 lies when the lighting unit 200 is in the retracted position. The solar panel 400 is provided at the inner side 201 of the lighting unit 200 such that it is concealed from sight when not in use while the lighting unit 200 is retracted upon the main unit 100.

The inner side 201 of the lighting unit 200 has a shape and size matching with that of the left side surface 101 of the main unit 100 such that they can fit neatly together. Furthermore, the surfaces of the two units 100 and 200 surrounding their confronting surface and side 101 and 201 meet substantially flush with each other, thereby giving rise to a unitary appearance that is smooth at least across the two units 100 and 200. While the lighting unit 200 is retracted upon the main unit 100, the light tubes 300 on its outer side 202 are fully exposed to illuminate the space to the left side of the lantern 10.

The lighting unit 200 is connected to the main unit 200 by means of a hinge assembly 500 which enables said pivotal movement of the lighting unit 200 relative to the main unit 100. The hinge assembly 500 is formed by two, first and second hinges 510 and 520 and a connecting member 501 which is connected by the first hinge 510 to the main unit 100 and by the second hinge 520 to the lighting unit 200.

The connecting member 501 is triangular wedge-shaped, having a body which is formed by a pair of left and right symmetrical parts 502 secured side-by-side together, each having a back wall 503 adjoining and co-planar with the other back wall 503. The left and right back walls 503 together define, as across their junction, a circular hole disposed co-axially about a tubular hinge protrusion 102 which is an integral part of the body of the main unit 100, at a top position on its left side surface 101.

The hinge protrusion 102 has an annular flange 103 retaining the combined back wall 503 of the connecting member 501, together implementing the first hinge 510 about which the connecting member 501 with the lighting unit 200 can turn about a generally horizontal hinge axis relative to the main unit 100.

The flange 103 has a toothed periphery having recesses 104 between adjacent teeth engageable by a pair of opposite inner round knobs 512 on a resiliently deformable ring 511 which is disposed co-axially about the flange 103. The ring 511 is angularly fixed within the body of the connecting member 501 for turning therewith, whose inner knobs 512 engage with respective nearest ones of the recesses 104 as it turns, thereby defining a series of discrete stable turning positions of the lighting unit 200 relative to the main unit 100.

Turning of the connecting member 501 is limited to about 180° by an arcuate quarter lip 504 inside its body engageable by an arcuate quarter step 105, on opposite sides thereof, fixed on the flange 103 of the hinge protrusion 102. With this arrangement, the lighting unit 200 with the connecting member 501 can only be turned back-and-forth between the lowermost position (pointing vertically downwards) of FIG. 1 and the uppermost position (pointing vertically upwards) of FIG. 2.

Opposite left and right side walls 505 of the connecting member 501 define a gap between them, into which a rear end stem 203 of the lighting unit 200 is inserted. A horizontal shaft 509 of the connecting member 501 extends through the stem 203, together implementing the second hinge 520 about which the lighting unit 200 can swing about another generally horizontal hinge axis relative to the connecting member 501 and hence the main unit 100.

The right side wall 505 of the connecting member 501 has a circular loop 506 centered at the shaft 509. The loop 506 has an inner periphery toothed to form recesses 507 between adjacent teeth engageable by a pair of opposite round knobs 205 on a resiliently deformable ring 204 which is disposed co-axially within the loop 506. The ring 204 is angularly fixed with the stem 203 of the lighting unit 200 by a pair of inner tabs 206 engaging relevant slots of the stem 203 for turning therewith. Upon turning, the knobs 205 engage with respective nearest ones of the recesses 507 to thereby define a series of discrete stable swinging positions of the lighting unit 200 relative to the connecting member 501 and hence the main unit 100.

Figure 2:
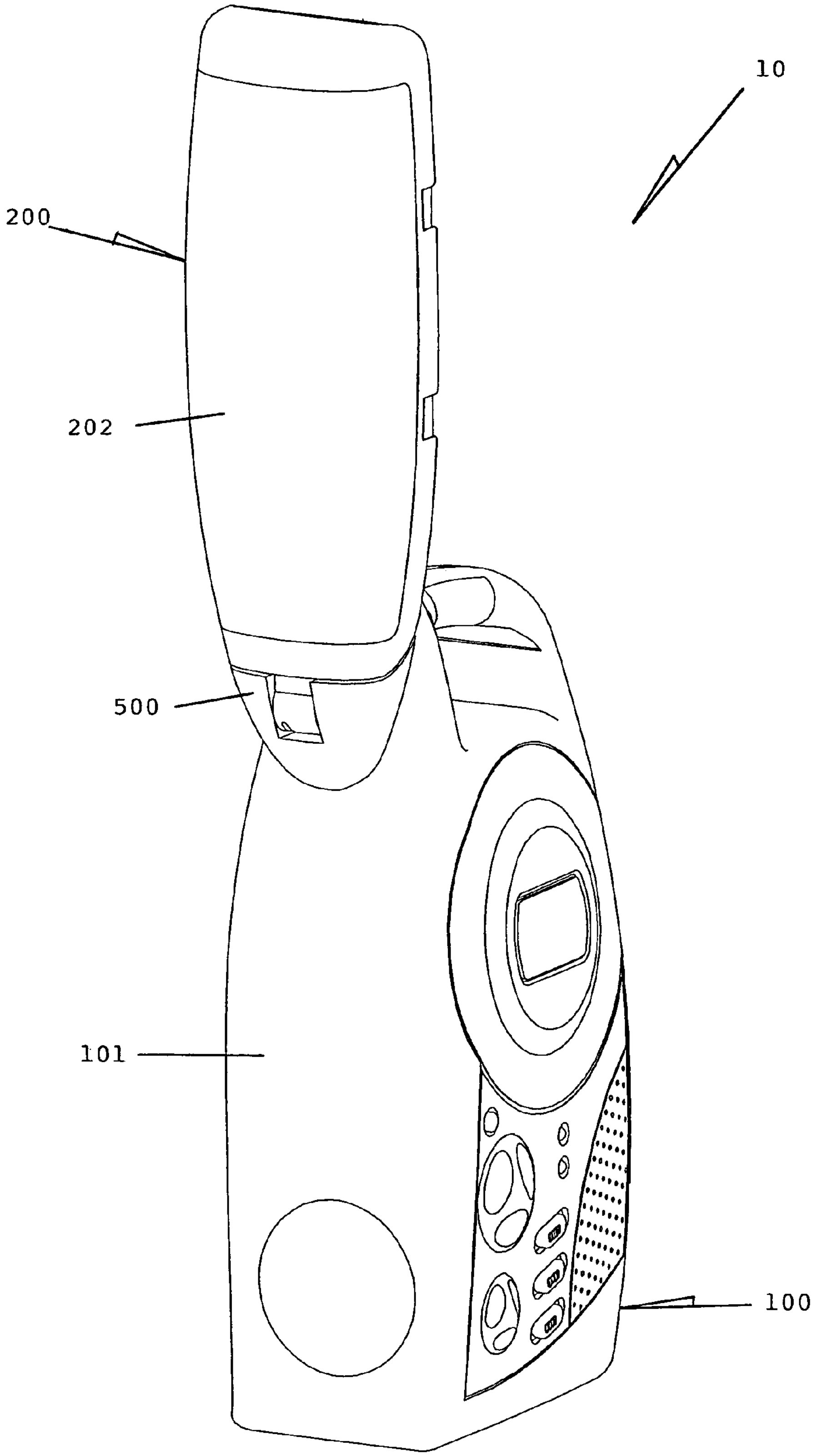
FIG. 2 is a perspective view similar to FIG. 1, showing the lighting unit swung upwards.
Figure 3:
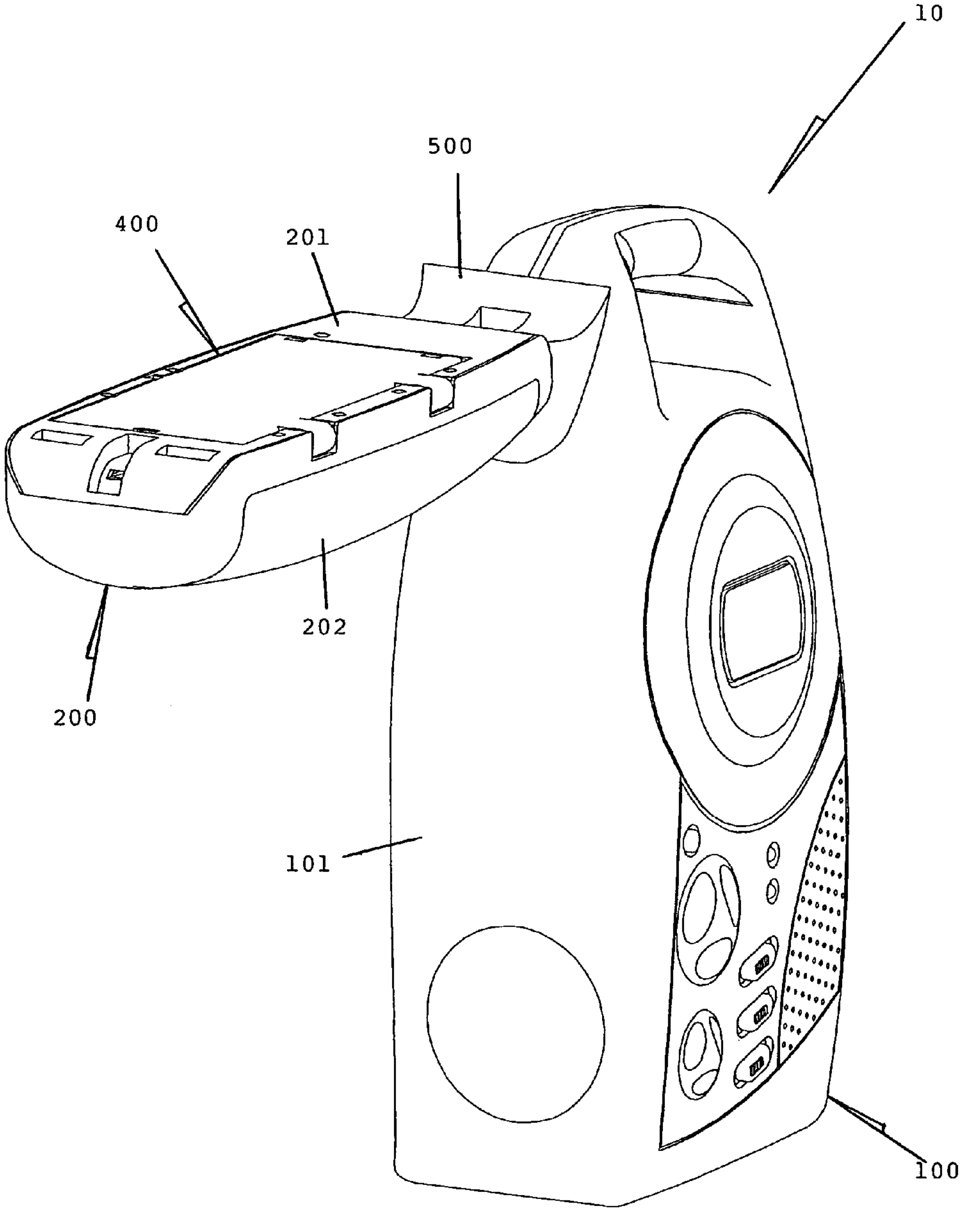
FIG. 3 is a perspective view similar to FIG. 2, showing the lighting unit pivoted downwards.

Swinging of the lighting unit 200 relative to the main unit 100 is limited to about 90° between the vertical position of FIG. 2 and the horizontal position of FIG. 3 or 4, by reason of the rear end of the lighting unit 200 being stopped upon engaging adjacent parts of the connecting member 501 at opposite ends of its travel.

Via the hinge protrusion 102 on the main unit 100 and the stem 203 of the lighting unit 200, wires from the light tubes 300 and solar panel 400 run through the connecting member 501 into the main unit 100 and are connected to the battery cells 101 and the relevant parts of the operating circuit.

In the normal condition of the lantern 10, the lighting unit 200 lies close upon the main unit 100 (FIG. 1), with the light tubes 300 facing laterally to illuminate the space to that side. The lighting unit 200 can be swung about the first hinge 510 upwardly from the main unit 100 (FIG. 2) so that the light tubes 300 can shine from a higher position. To illuminate downwardly, the lighting unit 200 can be pivoted downwardly about the second hinge 520 to a level position (FIG. 3).

In this position, the solar panels 410 and 420 are turned to the upper side facing upwardly, where the second panel 420 can be flipped open flat from the first panel 410 such that both panels 410 and 420 face upwardly (FIG. 4) for receiving sunlight to recharge the battery cells 101 and power the radio, for example, if it is turned on.

By reason of the two aforesaid hinge axes, i.e. the central axis of the hinge protrusion 102 and that of the shaft 509, extending at substantially right angles with each other resembling a universal joint, the lighting unit 200 can be manipulated to incline at any certain stable angle or angular position as desired with respect to the main unit 100. This is useful to select the angle at which the light tubes 300 illuminate or the angle at which the solar panel 400 faces the sun or a candescent light source directly for best light reception.

The invention has been given by way of example only, and various modifications of and/or alterations to the described embodiment may be made by persons skilled in the art without departing from the scope of the invention as specified in the appended claims.

The invention claimed is:

1. A portable lighting device comprising:

a main unit;

a rechargeable power storage device housed in the main unit; and a lighting unit having a housing with opposite first and second sides, a light source located within the housing and arranged to irradiate light through the first side of the housing, and a solar panel located within the housing and arranged to be illuminated by ambient light incident on the second side of the housing, wherein the housing of the lighting unit is attached to the main unit for hinged and swiveling movement with respect to the main unit, the housing of the light unit rotating about (i) a first axis between a first position in which the housing of the lighting unit is adjacent to a lateral side of the main unit and the first side of the housing of the lighting unit is exposed so that light produced by the light source can be radiated and the solar panel is between the housing of the lighting unit and the lateral side of the main unit and cannot be illuminated by ambient light, and a second position in which the solar panel is exposed to ambient light, and (ii) a second axis, substantially perpendicular to the first axis, when the lighting unit is not in the first position, for directing the solar panel toward a source of ambient light.

2. The portable lighting device as claimed in claim 1, wherein the second side of the housing of the lighting unit and the lateral side of the main unit have matching shapes and sizes.

3. The portable lighting device as claimed in claim 2, wherein the second side of the housing of the lighting unit and the lateral side of the main unit lie substantially flush with each other in the first position of the lighting unit.

4. The portable lighting device as claimed in claim 1, wherein the second side of the housing of the lighting unit extends substantially perpendicular to the lateral side of the main unit in the second position of the lighting unit.

5. The portable lighting device as claimed in claim 1, including a hinge assembly attaching the housing of the lighting unit to the main unit for hinged and swiveling movement of the housing of the lighting unit relative to the main unit.

6. The portable lighting device as claimed in claim 5, wherein the hinge assembly comprises a hinge having first and second parts and the first axis about which the lighting unit is rotatable with respect to the main unit and a swivel engaging the second part of the hinge and having the second axis about which the housing of the lighting unit swivels with respect to the main unit.

7. The portable lighting device as claimed in claim 1, wherein the light source comprises a florescent lamp.

8. The portable lighting device as claimed in claim 1, wherein the solar panel comprises two panels which are pivotable with respect to each other to lie close to each other in the first position of the lighting unit and to lie side-by-side when the housing of the lighting unit is not in the first position.

* * * * *